(12) United States Patent
Hasenplaugh et al.

(10) Patent No.: US 9,250,682 B2
(45) Date of Patent: Feb. 2, 2016

(54) DISTRIBUTED POWER MANAGEMENT FOR MULTI-CORE PROCESSORS

(71) Applicant: Intel Corporation, Santa Clara, CA (US)

(72) Inventors: William C. Hasenplaugh, Boston, MA (US); Tryggve Fossum, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 13/732,289

(22) Filed: Dec. 31, 2012

(65) Prior Publication Data

US 2014/0189413 A1 Jul. 3, 2014

(51) Int. Cl.
G06F 1/26 (2006.01)
G06F 1/32 (2006.01)
G06F 9/50 (2006.01)
G06F 9/38 (2006.01)

(52) U.S. Cl.
CPC ............ G06F 1/3206 (2013.01); G06F 1/3234 (2013.01); G06F 1/3243 (2013.01); G06F 9/5094 (2013.01); G06F 1/3203 (2013.01); G06F 1/324 (2013.01); G06F 1/3275 (2013.01); G06F 1/3287 (2013.01); G06F 1/3296 (2013.01); G06F 9/3885 (2013.01)

(58) Field of Classification Search
CPC ..... G06F 1/3203; G06F 1/324; G06F 1/3275; G06F 1/3287; G06F 1/3296; G06F 9/3885
USPC .................................. 713/300, 320, 330, 340
See application file for complete search history.

(56) References Cited

U.S. PATENT DOCUMENTS

| | | | |
|---|---|---|---|
| 7,389,440 B2 | 6/2008 | Bailey et al. |
| 7,392,414 B2 | 6/2008 | Bailey et al. |
| 7,562,240 B2 | 7/2009 | Tsuji |
| 7,596,705 B2 | 9/2009 | Kim |
| 7,664,971 B2 | 2/2010 | Oh |
| 7,702,938 B2 | 4/2010 | Ha |
| 7,721,119 B2 | 5/2010 | Capps, Jr. et al. |
| 7,788,519 B2 | 8/2010 | Bailey et al. |
| 7,865,751 B2 | 1/2011 | Monferrer et al. |
| 8,001,394 B2 | 8/2011 | Bose et al. |
| 8,015,427 B2 | 9/2011 | Miller et al. |
| 8,126,058 B2 | 2/2012 | Tseng et al. |
| 8,234,431 B2 | 7/2012 | Kruglick |
| 8,245,070 B2 | 8/2012 | Finkelstein et al. |
| 8,286,016 B2 | 10/2012 | Monferrer et al. |
| 8,316,368 B2 | 11/2012 | Vestal et al. |
| 8,347,303 B2 | 1/2013 | Singh et al. |
| 2006/0279152 A1 | 12/2006 | Ha |
| 2006/0288243 A1 | 12/2006 | Kim |

(Continued)

Primary Examiner — Michael J Brown
(74) Attorney, Agent, or Firm — Trop, Pruner & Hu, P.C.

(57) ABSTRACT

A system and method for performing distributed power control in a processor comprising an array of cores enables each core to regulate power at least partially independently. Global power management settings are made accessible to all cores and communication between cores propagates power consumption information between nearest neighbors in the array. Each core attempts to best regulate its own power consumption in accordance with global power consumption information and/or specific instructions from a global power manager. In this manner local opportunistic load balancing may be achieved in a scalable manner suitable for a large array of cores.

22 Claims, 4 Drawing Sheets

(56) References Cited

U.S. PATENT DOCUMENTS

| | | |
|---|---|---|
| 2008/0025409 A1 | 1/2008 | Tseng et al. |
| 2009/0199020 A1 | 8/2009 | Bose et al. |
| 2009/0271646 A1 | 10/2009 | Talwar et al. |
| 2010/0296238 A1 | 11/2010 | Mowry et al. |
| 2011/0078469 A1 | 3/2011 | Therien |
| 2011/0169562 A1 | 7/2011 | Li et al. |
| 2012/0039041 A1 | 2/2012 | Mowry et al. |
| 2012/0072746 A1 | 3/2012 | Sotomayor |
| 2012/0166832 A1* | 6/2012 | Henry et al. ............ 713/320 |

* cited by examiner

DISTRIBUTED POWER MANAGEMENT FOR MULTI-CORE PROCESSORS

This invention was made with Government support under contract number H98230-11-3-0011 awarded by the Department of Defense. The Government has certain rights in this invention.

FIELD

The present disclosure relates to processor power management and in particular, to distributed power management for multi-core processors.

BACKGROUND

In a typical multicore processor, a power management unit (PMU) communicates with a plurality of cores and manages power consumption with respect to computing requirements. The centralized PMU face linearly scaling computing requirements as the number of cores increases. Making matters even more challenging, communication latency also increases with the number of cores. As a result, multicore processor systems that delegate substantially all power management decisions to a single, centralized PMU are likely to require power management compromises due to the suboptimal scalability characteristics of the traditional centralized PMU paradigm. What is needed is a power management approach that scales well with the number of processors cores.

DESCRIPTION

Embodiments of the invention pertain to processors that include multiple execution cores to enhance performance and improve scalability. Some embodiments, for example, encompass high-performance computing (HPC) platforms that employ an array of dozens of execution cores. Some embodiments encompass network server platforms and other throughput-intensive environments that employ multicore processor architectures.

Embodiments of power management features described herein beneficially promote efficient operation in multicore processor systems. Disclosed embodiments, for example, enable multicore processor systems to run a nominal activity load at a minimum operating voltage without requiring over-implemented power delivery and cooling systems. By being more responsive to changing conditions and requirements, embodiments of disclosed power management features are able to deliver effective power management within a tighter operating window.

Disclosed embodiments address power management issues that arise in the conventional context of a centralized, PMU-based power control architecture in which an activity level of each core may be periodically polled by the PMU before making decisions about desired present and future operating power levels. In at least some of the conventional power management approaches, each core receive operational instructions directly from the PMU. When such a centralized control loop is used in a large multicore processor system to redistribute power load to maintain a fixed power consumption budget, e.g., by shifting power to "hot" threads (e.g., streaming memory and video processing) from so-called "cool threads", the communication latency associated with polling each core scales roughly with the square root of the number of cores and this may limit the ability to distribute power load optimally, particularly as the number of cores, n, increases.

Disclosed embodiments overcome disadvantages associated with power management strategies that assume all threads are substantially similar and should be constrained to remain at or below a defined activity level, thereby insuring that a desired power budget is maintained. Embodiments described herein recognize that such schemes generally do a poor job of accommodating workloads that vary significantly with time and further recognize that a time varying workload is characteristic in many throughput intensive environments. Embodiments of disclosed power management features are better able to tolerate bursts of high activity that produce sudden spikes in workload by being able to react to such occurrences with less latency.

In at least one embodiment, a distributed power management method disclosed herein allows a PMU to set global and/or individual parameters for each core, while a distributed control loop handles local enforcement and regulation of power activity in the individual cores. In at least one embodiment, each core is at least partially autonomous with respect to governing local processing activity in subject to global power targets (i.e., set points) for each core and for the entire processor. In some embodiments, the PMU may, for example, set power and frequency limits for each core and establish certain high priority cores. In some embodiments, each core may then attempt to drive the entire processor to a target set point and may be able to consume available power (i.e., when actual power consumption is less than the set point) with excess demand. In at least some embodiments, for example, when a core has a local set point of 50% activity but global power consumption on the entire processor is sufficiently below a global set point, the core may permit a burst of activity in excess of the local set point without abandoning global constraints. In this manner, disclosed embodiments implement an opportunistic load balancing of power consumption among cores.

In some embodiments, each core estimates the power consumption of the entire processor. Some embodiments, rather than trying to manage the long latencies and plethora of messages that result when each core communicates with all other cores, maintain a communication framework in which each core communicates nearest neighbor cores only. From its nearest neighbors, each cores is able to estimate the processor's cumulative power consumption. With each core communicating power consumption information with its nearest neighbors, the power consumption information propagates throughout the system over a number of clock cycles. Although limiting communication to certain nearest neighbors may mean that no single core knows the cumulative power consumption at any point it time, it doing so enables individual cores to make localized power management decisions based on meaningful estimates of global power conditions.

In some embodiments, a disclosed power management method for a processor system comprising an array of cores includes receiving, by a first core included in the array of cores, power consumption information from a first subset of cores in the array. The first subset may exclude the first core, while the power consumption information received at the first core may be indicative of power consumption of the array of cores. The method may also include determining, by the first core, internal power consumption of the first core, and estimating, by the first core, power consumption for the array of cores based on the power consumption information and the internal power consumption. The method may further include regulating, by the first core, power consumption of the first core to comply with global power management settings accessible to the array of cores.

In some embodiments, the first subset consists of nearest neighbor cores sharing a boundary line with the first core. The method may include outputting updated power consumption information to the first subset, while the updated power consumption information may include the internal power consumption of the first core. Each core in the array of cores may periodically perform the method. Regulating may include modifying the power consumption of the first core to: increase power consumption, decrease power consumption, zero power consumption, maximize power consumption, maintain power consumption, or a combination thereof. The global power management settings may include a first set point for the first core and/or a second set point for the array of cores in aggregate. The array of cores may be a rectangular grid of cores.

In at least one embodiment, a disclosed processor includes a power management unit and an array of cores. A core in the array may include a self-regulation unit to perform a power management cycle. The power management cycle may include receiving, at the core, power consumption information from a subset of cores in the array, the subset excluding the core. The power consumption information received may be indicative of power consumption of the array of cores. The power management cycle may also include determining internal power consumption of the core, and estimating, by the core, power consumption for the array of cores based on the power consumption information and the internal power consumption. The power management cycle may further include regulating, by the core, power consumption of the core to comply with global power management settings accessible to the array of cores, and outputting updated power consumption information to the subset. The updated power consumption information may include the internal power consumption of the core.

In particular embodiments, the self-regulation unit may periodically repeat the power management cycle. The array of cores may be a rectangular grid comprising columns and rows of cores in the array, while the subset may consist of up to four nearest neighbor cores sharing a boundary line with the core. The core may be to receive southern power control information indicative of cores in the array sharing a column with the core and situated south of the core, receive northern power control information indicative of cores in the array sharing the column with the core and situated north of the core, receive western power control information indicative of cores in the array situated west of the column, and receive eastern power control information indicative of cores in the array situated east of the column. Outputting updated power consumption information to the subset may include outputting east bound power control information to an eastern neighbor core, outputting west bound power control information to a western neighbor core, outputting north bound power control information to a northern neighbor core, and outputting south bound power control information to a southern neighbor core. The east bound power control information may include a western power control information received in a previous power management cycle; a northern power control information received in the previous power management cycle, a southern power control information received in the previous power management cycle, and the internal power consumption for a current power management cycle. The west bound power control information may include an eastern power control information received in the previous power management cycle, the northern power control information received in the previous power management cycle, the southern power control information received in the previous power management cycle, and the internal power consumption for the current power management cycle. The north bound power control information may include the southern power control information received in the previous power management cycle, and the internal power consumption for the current power management cycle. The south bound power control information may include the northern power control information received in the previous power management cycle, and the internal power consumption for the current power management cycle. The global power management settings may be received from the power management unit and may include specific instructions for the first core.

In other embodiments, a disclosed system comprises a processor comprising a plurality of cores and a power management unit, and a memory accessible to the processor. Each core in the plurality of cores, including a first core, may include a self-regulation unit to perform a power management cycle. The power management cycle may include receiving, at the first core, power consumption information from a subset of the plurality of cores, the subset excluding the first core. The power consumption information received may be indicative of power consumption of the plurality of cores. The power management cycle may also include determining internal power consumption of the first core, and estimating, by the first core, power consumption for the plurality of cores based on the power consumption information and the internal power consumption. The power management cycle may further include regulating, by the first core, power consumption of the first core to comply with global power management settings accessible to the plurality of cores, and outputting updated power consumption information to the subset. The updated power consumption information may include the internal power consumption of the first core.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
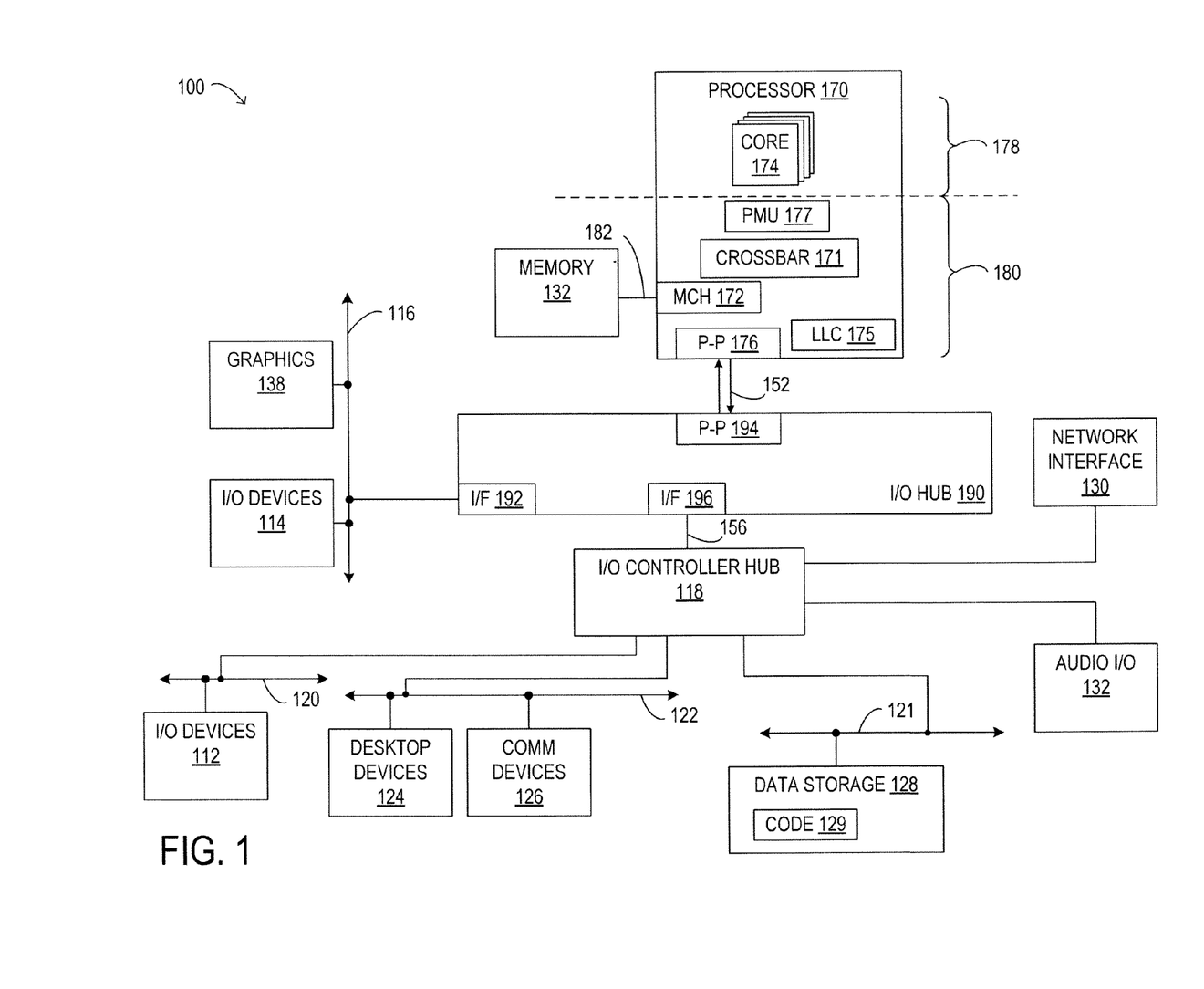
FIG. 1 is a block diagram of selected elements of an embodiment of a processor system.

Embodiments may be implemented in many different system types. Referring now to FIG. 1, a block diagram of selected elements of a processor system in accordance with an embodiment of the present disclosure. FIG. 1 shows a system in which processors, memory, and input/output devices are interconnected by a number of point-to-point (P-P) interfaces, as will be described in further detail. However, in other embodiments (not shown in FIG. 1) the processor system may employ different bus architectures, such as a front side bus, a multi-drop bus, and/or another implementation. Although one processor is depicted in the example embodiment of FIG. 5 for descriptive clarity, in various embodiments, the point-to-point system architecture shown in FIG. 5 may be implemented with two processors. It is further noted that, in some embodiments, different numbers of processors may be employed using elements of the depicted architecture.

In the FIG. 1 embodiment, computer system 100 is a high performance computing system that includes multiple processing cores, referred to herein simply as cores, in one or more processors 170. In the FIG. 1. embodiment of computer system 100, the processor 170 is a multi-core processor including a plurality of cores 174, which may vary in number in individual implementations, as desired. As shown, a portion of processor 170 including cores 174 may be referred to as core portion 178, while a portion of processor 170 including other elements, yet excluding cores 174, may be referred to as uncore portion 180. In different embodiments (not shown in FIG. 1), a varying number of cores may be present in a particular processor. Cores 174 may comprise a number of sub-elements (not shown in FIG. 1), also referred to as clusters, that provide different aspects of overall functionality. For example, cores 174 may each include a memory cluster (not shown in FIG. 1) that may comprise one or more levels of cache memory. Other clusters (not shown in FIG. 1) in cores 174 may include a front-end cluster and an execution cluster.

As will be described in further detail, cores 174 may perform distributed power regulation and implement a distributed control loop for regulating power consumption of processor 170. In given embodiments, cores 174 may be physically arranged in a grid based on a rectangular geometry (see FIG. 2A). Cores 174 may include internal power monitoring and power regulation ability and may also communicate directly with each other, in given embodiments. In particular embodiments, cores 174 within processor 170 may not communicate directly with each other, but rather, may communicate via crossbar 171, which may include intelligent functionality such as cache control, data queuing, P-P protocols, and multi-core interfacing. Crossbar 171 may thus represent an intelligent uncore controller for uncore portion 180 that interconnects cores 174 with memory controller hub (MCH) 172, last-level cache memory (LLC) 175, P-P interface 176, and power management unit (PMU) 177 (also referred to as a power control unit (PCU)) for centralized and/or distributed power management, among other elements. In particular, to improve performance in such an architecture, cache controller functionality within crossbar 171 may enable selective caching of data within a cache hierarchy including LLC 175 and/or one or more caches present in cores 174. In certain embodiments (not shown), crossbar 171 includes a memory management unit that handles access to virtual memory addresses and maintains at least one translation lookaside buffer (not shown in FIG. 1) for improved performance with regard to memory access.

In FIG. 1, LLC 175 may be coupled to processor cores 174 respectively. For example, LLC 175 may be shared by cores 174. LLC 175 may be fully shared such that any single one of cores 174 may fill or access the full storage capacity of LLC 175. Additionally, MCH 172 may provide for direct access by processor 170 to memory 132 via memory interface 182. For example, memory 132 may be a double-data rate (DDR) type dynamic random-access memory (DRAM) while memory interface 182 and MCH 172 comply with a DDR interface specification. Memory 132 may represent a bank of memory interfaces (or slots) that may be populated with corresponding memory circuits for a desired DRAM capacity.

Processor 170 may also communicate with other elements of processor system 100, such as I/O hub 190 and I/O controller hub 118, which are also collectively referred to as a chip set that supports processor 170. P-P interface 176 may be used by processor 170 to communicate with I/O hub 190 via interconnect link 152. In certain embodiments, P-P interfaces 176, 194 and interconnect link 152 are implemented using Intel QuickPath Interconnect architecture.

As shown in FIG. 5, crossbar 190 includes interface 192 to couple crossbar 190 with first bus 116, which may support high-performance I/O with corresponding bus devices, such as graphics 138 and/or other bus devices, represented by I/O devices 114. Graphics 138 may represent a high-performance graphics engine that outputs to a display device (not shown in FIG. 1). In one embodiment, first bus 116 is a Peripheral Component Interconnect (PCI) bus, such as a PCI Express (PCIe) bus and/or another computer expansion bus. I/O hub 190 may also be coupled to I/O controller hub 118 at interface 196 via interconnect link 156. In certain embodiments, interface 196 is referred to as a south bridge. I/O controller hub 118 may provide I/O interconnections for various computer system peripheral devices and interfaces and may provide backward compatibility with legacy computer system peripheral devices and interfaces. Thus, I/O controller hub 118 is shown providing network interface 130 and audio I/O 132, as well as, providing interfaces to second bus 120, third bus 122, and fourth bus 121, as will be described in further detail.

Second bus 120 may support expanded functionality for microprocessor system 100 with I/O devices 112, and may be a PCI-type computer bus. Third bus 122 may be a peripheral bus for end-user consumer devices, represented by desktop devices 124 and communication devices 126, which may include various types of keyboards, computer mice, communication devices, data storage devices, bus expansion devices, etc. In certain embodiments, third bus 122 represents a Universal Serial Bus (USB) or similar peripheral interconnect bus. Third bus 121 may represent a computer interface bus for connecting mass storage devices, such as hard disk drives, optical drives, disk arrays, which are generically represented by data storage 128, shown including code 130 that may be executable by processor 170.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 2A:
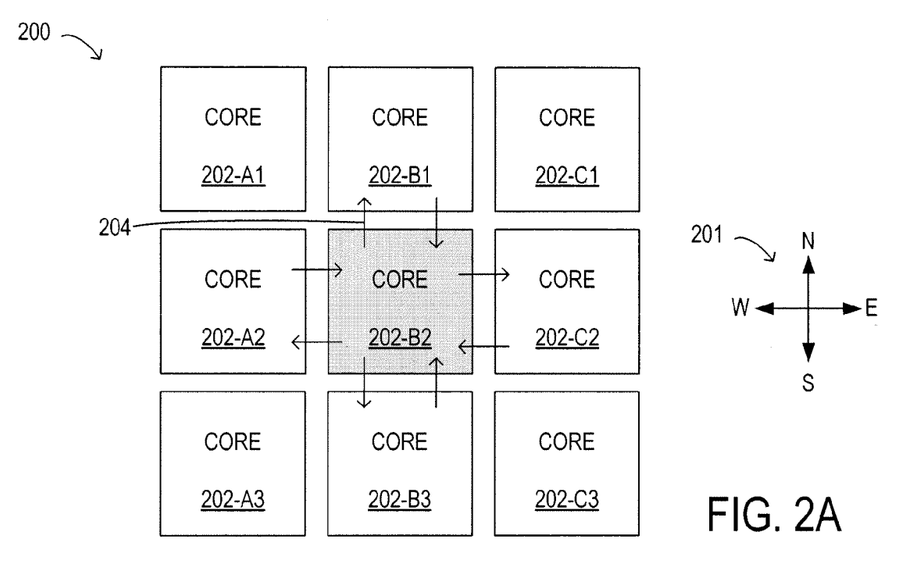
FIG. 2A is a block diagram of selected elements of an embodiment of an array of self-regulating cores.

Turning now to FIG. 2A, a block diagram of selected elements of an embodiment of core array 200 is illustrated. As shown in FIG. 2A, core array 200 is comprised of 9 cores which are depicted as squares for illustrative purposes. It is noted that other rectangular and non-rectangular geometries may be implemented in core array 200 in various embodiments (not shown). In FIG. 2A, cores 202 in core array 200 have been further designated in rows by letter (e.g. first row of cores 202-A1, 202-A2, 202-A3) and columns by number (e.g.

first column of cores 202-A1, 202-B1, 202-C1). Although each core 202 in core array 200 may be equivalent, core 202-B2 represents an exemplary central core in core array 200 that will be described in further detail. Also shown in FIG. 2 are cardinal directions 201, which serve to orient cores 202 by north, south, east, and west, respectively. When referring to cardinal directions 201 in general, it will be understood that specific cores 202 at a peripheral location within core array 200 may have certain null values according to respective boundary conditions, such as a corner and/or an edge, where appropriate.

In FIG. 2A, nearest neighbor communication paths to core 202-B2 are shown as links 204. Nearest neighbors may include cores sharing a boundary line with core 202-B2. Although not shown in FIG. 2A, it will be understood that each core 202 may be similarly configured as core 202-B2, with the exception of any boundary conditions that exist. When core array 200 is a rectangular array, the 4 nearest neighbors to core 202-B2 are: north—core 202-B1; south—core 202-B3; west—core 202-A2; and east—core 202-C2. It is noted that diagonal cores 202-A1, 202-C1, 202-A3, and 202-C3 are not considered nearest neighbors in the implementation discussed herein, but may be included as nearest neighbors in other embodiments (not shown). Links 204 are shown in core array 200 as bidirectional pairs with each nearest neighbor to core 202-B2, as an example of bidirectional communication. The bidirectional communication represented by links 204 may be any of a number of different types of communication methods and media usable for inter-core communication, including (but not limited to):

- direct core-core links, such as a direct analog or digital pathway between individual cores;
- a multi-drop peer-peer core bus, where each core linked to the peer-peer core bus may act as a talker and/or a listener on the bus and may address other core(s);
- wireless core network, such as an ultra-low power wireless mesh network within a range constrained to about an area of core array 200; and
- an externally controlled core bus, in which a PCU (and/or another bus-controlling element) serves as bus master and may facilitate messages between cores.

As will be described in further detail, links 204 may be limited to communication between nearest neighbors in core array 200 to implement distributed power management according to the methods presented herein.

Figure 2B:
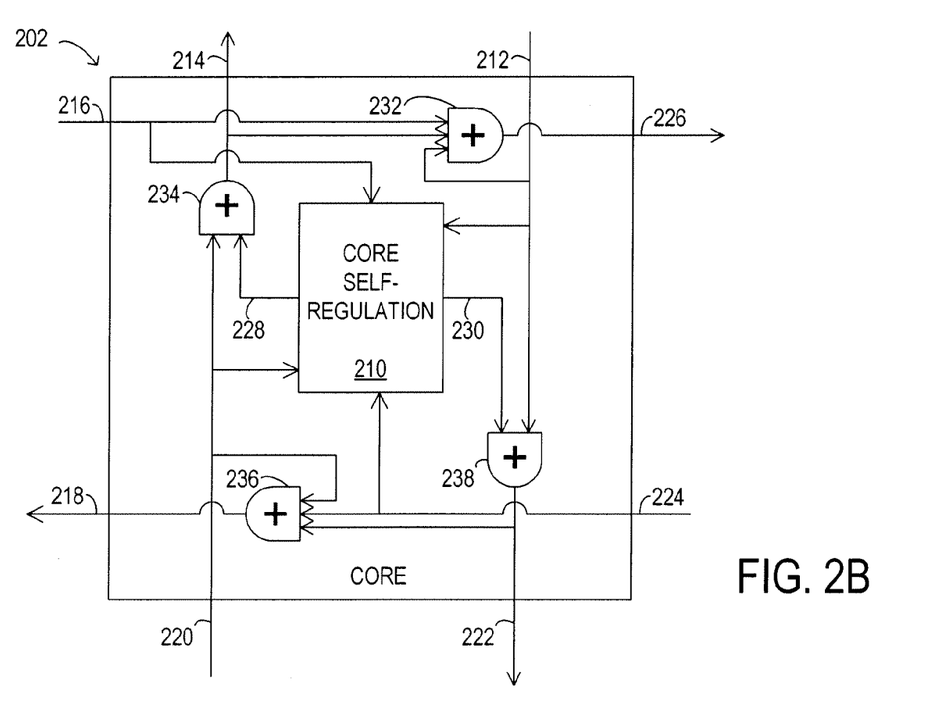
FIG. 2B is a block diagram of selected elements of an embodiment of a self-regulating core.

Turning now to FIG. 2B, a block diagram of selected elements of an embodiment of core 200 is illustrated. As shown in FIG. 2B, core 202 may implement an internal algorithm for self-regulating power consumption according to the distributed power management methods presented herein. Certain portions of the internal algorithm are shown as graphical flow elements. In addition, core 202 is shown including core self-regulation 210, which may implement a self-regulation algorithm to generate outputs 228, 230, representing power consumption values for core 202. In certain embodiments, outputs 228, 230 may represent a single power consumption value. Core self-regulation 210 may also modulate core activity and power draw to regulate power.

As shown in FIG. 2B, core 202 has 8 external links, corresponding to links 204 (see FIG. 2A). Specifically, north input 212 and north output 214 are links from and to a northern nearest neighbor (not shown in FIG. 2B). Similarly, south input 220 and south output 222 link to a southern nearest neighbor (not shown in FIG. 2B). Also west input 216 and west output 218 link to a western nearest neighbor (not shown in FIG. 2B). Finally, east input 224 and east output 224 are links to an eastern nearest neighbor (not shown in FIG. 2B).

As shown, the graphical algorithm for generating the 4 output links (214, 218, 222, and 226) propagates information to other nearest neighbors (not shown in FIG. 2B) of core 202. North output 214 is generated by adder 234 as a sum of south input 220 and output 228. West output 218 is generated by adder 236 as a sum of south input 220, east input 224 and east input 224. South output 222 is generated by adder 238 as a sum of north input 212, and output 230. East output 226 is generated by adder 232 as a sum of west input 216, north output 214 and north input 212. Also, core self-regulation unit 210 is shown receiving north input 214, west input 216, south input 220, and east input 224.

In operation, core 202 may receive inputs describing power consumption of other cores and regions of the processor and so remain sufficiently apprised of both local and global power consumption at all times in order to perform distributed power regulation. When a plurality of cores, such as core array 200, are implemented using core 202 as shown in FIG. 2B, a distributed control loop in which each core regulates power with a degree of independence may be realized.

Figures 3A, 3B:
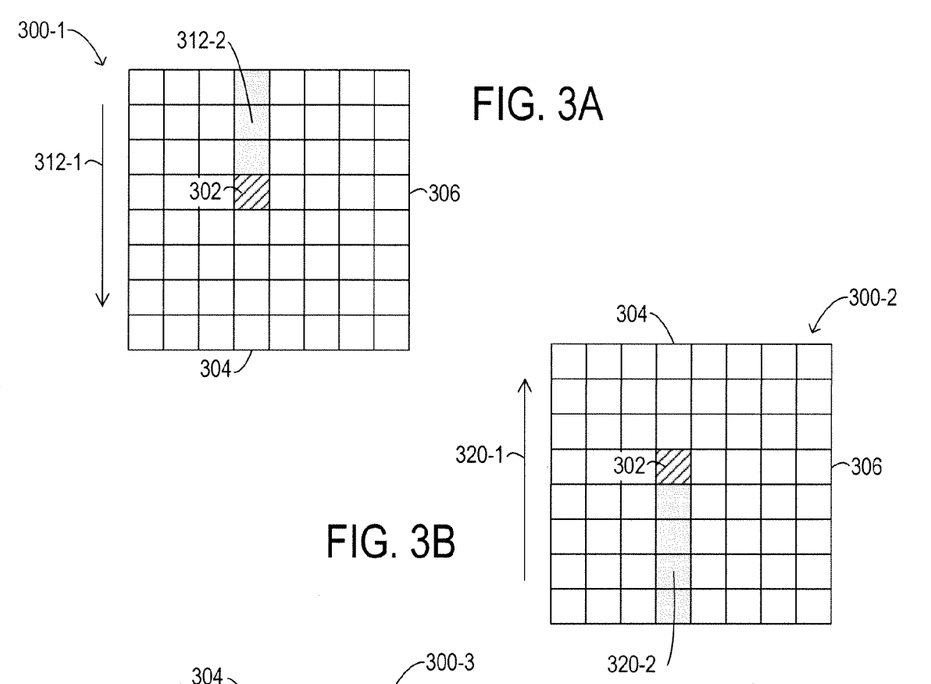
FIGS. 3A, 3B, 3C, and 3D are block diagrams of selected elements of an embodiment of an array of self-regulating cores.

Turning now to FIG. 3A, selected elements of an embodiment of core array 300-1 is illustrated. Core array 300 may be another embodiment of core array 200, while core 302 may represent an embodiment of core 202 (see FIGS. 2A, 2B) that is located at column 304 and row 306. As shown in FIG. 3A, core array 300-1 illustrates how inputs to core 302 (presented as an arbitrary example core) transmit power consumption information about other cores and/or regions in core array 300-1 when the algorithm depicted in FIG. 2B is used. Specifically, power consumption information arriving from direction 312-1 (i.e., a north input) to core 302 may convey power consumption information about cores 312-1 situated north of core 302 in column 304. It is noted that power consumption information arriving from direction 312-1 to core 302 may not provide any information about other cores in row 306. Accordingly, an output from core 302 in direction 312-1 (i.e., a south output) may represent a sum of local power consumption at core 302 plus power consumption information about cores 312-2.

Referring now to FIG. 3B, selected elements of an embodiment of core array 300-2 is illustrated. Core array 300-2 is substantially similar to core array 300-1, but shows power consumption information arriving from direction 320-1 (i.e., a south input) to core 302, which may convey power consumption information about cores 320-2 in column 304, but does not reflect any information about other cores in row 306. Also, an output from core 302 in direction 320-1 (i.e., a north output) may represent a sum of local power consumption at core 302 plus power consumption information about cores 320-2.

Figures 3C, 3D:
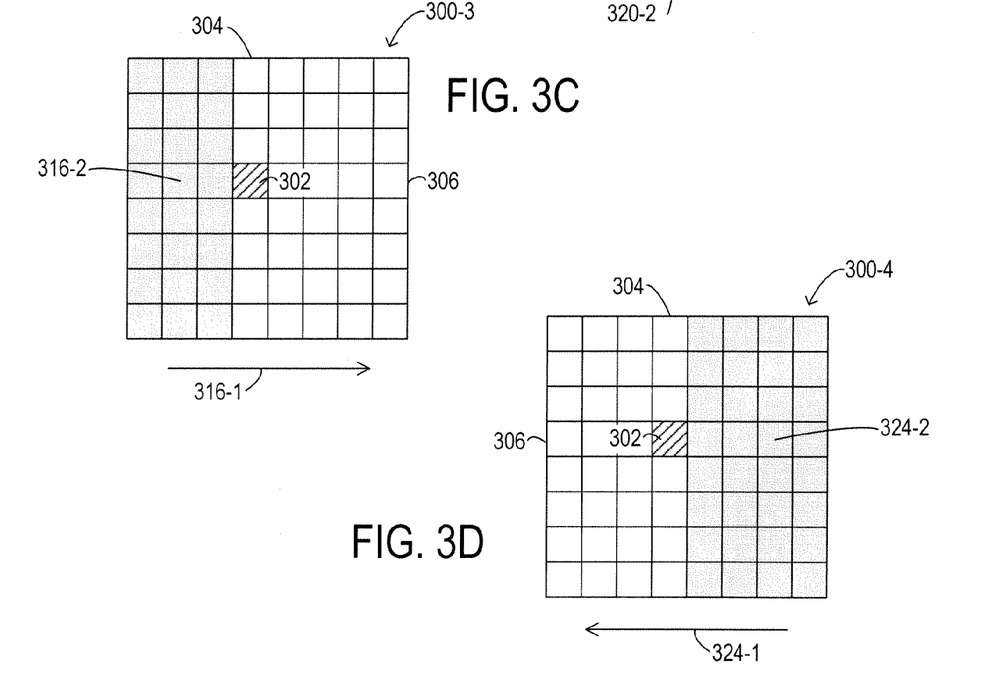

Referring now to FIG. 3C, selected elements of an embodiment of core array 300-3 is illustrated. Core array 300-3 is substantially similar to core array 300-1, but shows power consumption information arriving from direction 316-1 (i.e., a west input) to core 302, which may convey power consumption information about cores 316-2 in all columns west of column 304, but does not reflect any information about other cores in column 304 or columns east of column 304. Also, an output from core 302 in direction 316-1 (i.e., an east output) may represent a sum of local power consumption at core 302 plus power consumption information about cores 316-2 plus power consumption information about the other cores in column 304, as received according to FIGS. 3A, 3B.

Referring now to FIG. 3D, selected elements of an embodiment of core array 300-4 is illustrated. Core array 300-4 is substantially similar to core array 300-1, but shows power consumption information arriving from direction 324-1 (i.e., an east input) to core 302, which may convey power consumption information about cores 324-2 in all columns east of column 304, but does not reflect any information about other cores in column 304 or columns west of column 304. Also, an output from core 302 in direction 324-1 (i.e., a west output) may represent a sum of local power consumption at core 302 plus power consumption information about cores 324-2 plus power consumption information about the other cores in column 304, as received according to FIGS. 3A, 3B.

In summary, FIGS. 3A-D depict how power consumption information about core activity is propagated when the algorithm depicted in FIG. 2B is implemented using core array 300. For each cycle in the distributed control loop, power consumption information passed between cores may reflect each core's local activity level as well as an estimate of global activity level for all cores in the processor. As noted previously, for cores that are situated with an edge and/or corner boundary of core array 300, null values (or other predefined boundary values) may be used for inputs and outputs at such boundary conditions.

In one exemplary embodiment, the distributed control loop includes the following interface specification between a PMU (not shown in FIG. 3, see FIG. 1) and each of the cores in core array 300.
 a) Inputs to Core
   Power budget: specifies available activity that a core may consume as desired;
   Mandatory slowdown: forces core to issue null operations and/or remain idle to reduce power load; and
   Mandatory speedup: forces core to issue power consuming instructions, such as dummy video processing instructions.
 b) Outputs from Core
   Power consumed: specifies actual activity at a core.
 c) Machine state registers
   The PMU may populate registers in the control system to specify the set points and other regulation parameters, as desired.

Figure 4:
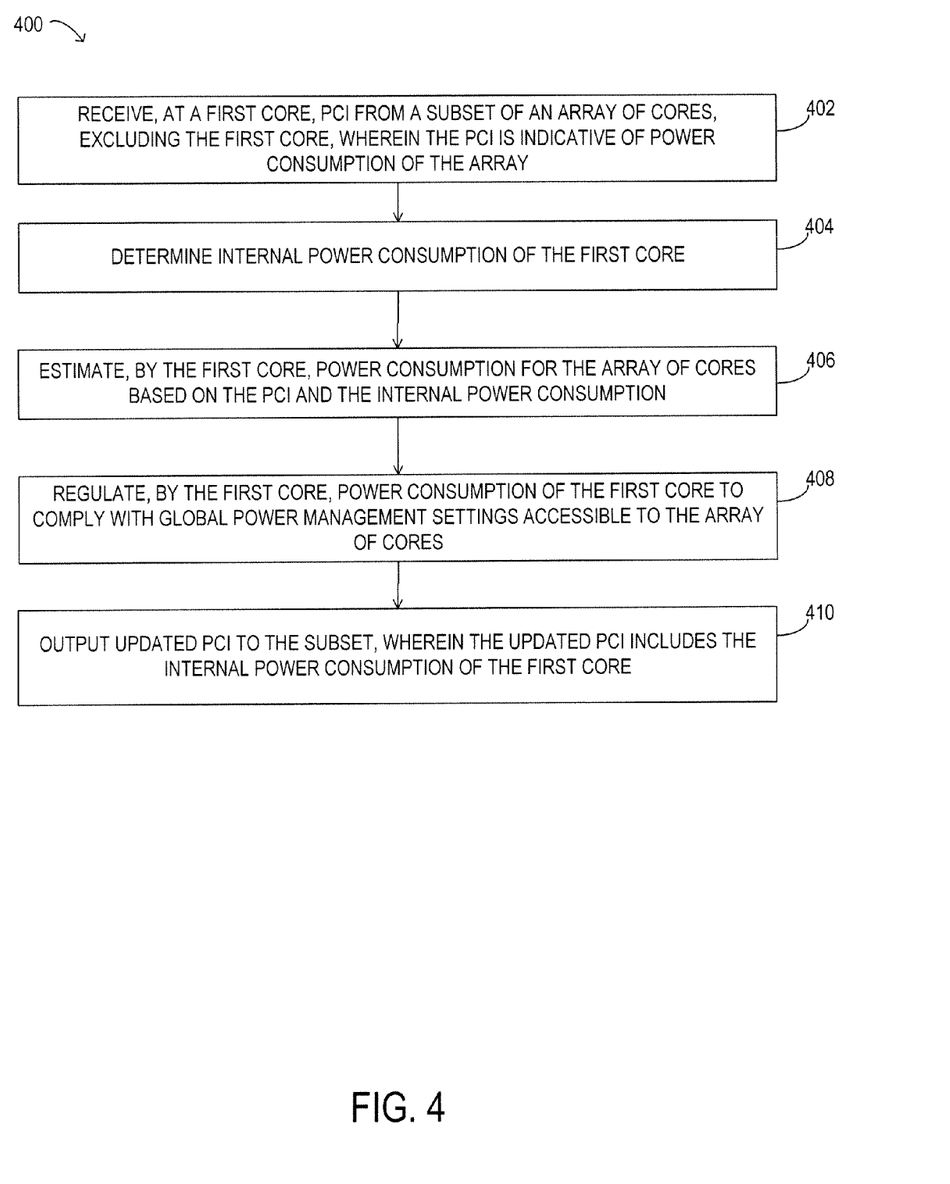
FIG. 4 is a flow chart describing selected elements of an embodiment of a method for core self-regulation.

Turning now to FIG. 4, a flow chart describing selected elements of an embodiment of method 400 for implementing distributed power management is illustrated. It is noted that operations in method 400 may be omitted or rearranged in different embodiments, as desired. Method 400 may be executed, at least in part, by PMU 170 in conjunction with cores 174 (see FIG. 1). It will be understood that distributed power management may be implemented in a recurring manner and that method 400 may represent a single cycle in an ongoing power regulation loop.

Method 400 may begin by receiving (operation 402), at a first core, power consumption information from a subset of an array of cores, excluding the first core. The power consumption information may be indicative of power consumption of the array. Then, internal power consumption of the first core may be determined (operation 404). Power consumption for the array of cores may be estimated (operation 406) by the first core based on the power consumption information and the internal power consumption. The power consumption of the first core may be regulated (operation 408) by the first core to comply with global power management settings accessible to the array of cores. The regulation in operation 408 may include increasing, decreasing, maximizing, minimizing, maintaining, and/or zeroing power consumption of the first core. The regulation in operation 408 may also be based on specific instructions issued to the first core regarding internal power consumption at the first core. The global power management settings may include a first set point for the first core and/or a second set point for the array of cores in aggregate.

Next, updated power consumption information is output (operation 410) to the subset. The updated power consumption information may include the internal power consumption of the first core.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
 receiving, by a first processing core included in an array of processing cores of a processor, power consumption information from a first subset of other processing cores in the array, wherein the power consumption information received by the first processing core is indicative of power consumption of the array of processing cores;
 determining, in the first processing core, internal power consumption of the first processing core;
 estimating, in the first processing core, power consumption for the array of processing cores based on the power consumption information and the internal power consumption; and
 regulating, in the first processing core, power consumption of the first processing core to comply with global power management settings accessible to the array of processing cores.

2. The method of claim 1, wherein the first subset of other processor cores are nearest neighbor cores sharing a boundary line with the first processing core.

3. The method of claim 1, further comprising: outputting updated power consumption information to the first subset of other processing cores, wherein the updated power consumption information includes the internal power consumption of the first processing core.

4. The method of claim 1, wherein regulating the power consumption of the first processing core includes performing an action selected from:
 increasing power consumption, decreasing power consumption, zeroing power consumption, maximizing power consumption, and maintaining power consumption.

5. The method of claim 1, wherein the global power management settings include a setting selected from:
 a first set point for the first processing core and a second set point for the array of processing cores in aggregate.

6. The method of claim 1, further comprising receiving the global power management settings from a power management unit of the processor.

7. The method of claim 1, further comprising permitting, by the first processing core, the first processing core to have an activity burst greater than a local power management setting.

8. The method of claim 7, further comprising permitting, by the first processing core, the first processing core to have the activity burst greater than the local power management setting, when the estimated power consumption information for the array of processing cores is less than the global power management settings.

9. A processor, comprising:
 a power management unit; and
 an array of cores, wherein a core in the array includes a self-regulation unit to perform a power management cycle, the power management cycle to:

receive power consumption information from a subset of cores in the array, wherein the power consumption information received is indicative of power consumption of the array of cores;

determine internal power consumption of the core;

estimate, by the core, power consumption for the array of cores based on the power consumption information and the internal power consumption;

regulate, by the core, power consumption of the core to comply with global power management settings accessible to the array of cores; and output updated power consumption information to the subset, wherein the updated power consumption information includes the internal power consumption of the core.

10. The processor of claim 9, wherein the array of cores is a rectangular grid comprising columns and rows of cores in the array, and wherein the subset has up to four nearest neighbor cores sharing a boundary line with the core, and wherein the core is operable to:

receive southern power control information indicative of cores in the array sharing a column with the core and situated south of the core;

receive northern power control information indicative of cores in the array sharing the column with the core and situated north of the core;

receive western power control information indicative of cores in the array situated west of the column; and receive eastern power control information indicative of cores in the array situated east of the column.

11. The processor of claim 10, wherein the self-regulation unit is to:

output east bound power control information to an eastern neighbor core, the east bound power control information comprising the sum of:
  a western power control information received in a previous power management cycle;
  a northern power control information received in the previous power management cycle;
  a southern power control information received in the previous power management cycle; and
  the internal power consumption for a current power management cycle;

output west bound power control information to a western neighbor core, the west bound power control information comprising the sum of:
  an eastern power control information received in the previous power management cycle;
  the northern power control information received in the previous power management cycle;
  the southern power control information received in the previous power management cycle; and
  the internal power consumption for the current power management cycle;

output north bound power control information to a northern neighbor core, the north bound power control information comprising the sum of:
  the southern power control information received in the previous power management cycle; and
  the internal power consumption for the current power management cycle; and output south bound power control information to a southern neighbor core, the south bound power control information comprising the sum of:
  the northern power control information received in the previous power management cycle; and
  the internal power consumption for the current power management cycle.

12. The processor of claim 9, wherein the global power management settings include a setting selected from: a first set point for the core and a second set point for the array of cores in aggregate.

13. The processor of claim 9, wherein the global power management settings are to be received from the power management unit.

14. The processor of claim 9, wherein the core is to further receive the global power management settings from a power management unit of the processor.

15. The processor of claim 9, wherein the core is to permit the core to have an activity burst greater than a local power management setting.

16. The processor of claim 15, wherein the core is to permit the core to have the activity burst greater than the local power management setting, when the estimated power consumption for the array of cores is less than the global power management settings.

17. A system comprising:
  a multi-core processor, comprising:
    a plurality of processing cores; and
    a central power management unit to provide global power management settings; and
  a memory, accessible to the plurality of processing cores, including processor executable power management instructions, which when executed by a first processing core, cause the first processing core to:
    receive power consumption information from a subset of the plurality of processing cores excluding the first processing core, wherein the power consumption information received is indicative of power consumption of the plurality of processing cores;
    evaluate internal power consumption of the first processing core;
    estimate, by the first processing core, power consumption for the plurality of processing cores based on the power consumption information and the internal power consumption;
    regulate, by the first processing core, power consumption of the first processing core to comply with global power management settings accessible to the plurality of processing cores; and
    output updated power consumption information to the subset, wherein the updated power consumption information includes the internal power consumption of the first core.

18. The system of claim 17, wherein the plurality of processing cores is a rectangular grid comprising columns and rows of processing cores, and wherein the subset has up to four nearest neighbor processing cores sharing a boundary line with the first processing core, and wherein the first processing core is operable to:

receive southern power control information indicative of processing cores in the array sharing a column with the first processing core and situated south of the first processing core;

receive northern power control information indicative of processing cores in the array sharing the column with the first processing core and situated north of the first processing core;

receive western power control information indicative of processing cores in the array situated west of the column; and receive eastern power control information indicative of processing cores in the array situated east of the column.

19. The system of claim 18, wherein the output of updated power consumption information to the subset includes:
output of east bound power control information to an eastern neighbor processing core, the east bound power control information comprising the sum of:
a western power control information received in a previous power management cycle;
a northern power control information received in the previous power management cycle;
a southern power control information received in the previous power management cycle; and
the internal power consumption for a current power management cycle;
output of west bound power control information to a western neighbor processing core, the west bound power control information comprising the sum of:
an eastern power control information received in the previous power management cycle;
the northern power control information received in the previous power management cycle;
the southern power control information received in the previous power management cycle; and
the internal power consumption for the current power management cycle;
output of north bound power control information to a northern neighbor processing core, the north bound power control information comprising the sum of:
the southern power control information received in the previous power management cycle; and
the internal power consumption for the current power management cycle; and
output of south bound power control information to a southern neighbor processing core, the south bound power control information comprising the sum of:
the northern power control information received in the previous power management cycle; and
the internal power consumption for the current power management cycle.

20. The system of claim 17, wherein the global power management settings include a setting selected from: a first set point for the first processing core and a second set point common to the plurality of processing cores.

21. The system of claim 17, wherein the global power management settings are to be received from the power management unit.

22. The system of claim 17, wherein the regulation includes modification of the power consumption of the first processing core to perform at least one of: increase power consumption, decrease power consumption, zero power consumption, maximize power consumption, and maintain power consumption.

* * * * *